(12) United States Patent
Suzuki et al.

(10) Patent No.: US 7,639,682 B2
(45) Date of Patent: Dec. 29, 2009

(54) COMMUNICATION QUALITY MANAGEMENT AND APPARATUS (75) Inventors: Kazuya Suzuki, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 419 days.

(21) Appl. No.: 10/591,245

(22) PCT Filed: Nov. 19, 2004

(86) PCT No.: PCT/JP2004/017281

§ 371 (c)(1),
(2), (4) Date: Aug. 31, 2006

(87) PCT Pub. No.: WO2005/099188

PCT Pub. Date: Oct. 20, 2005

(65) Prior Publication Data

US 2008/0095159 A1    Apr. 24, 2008

(30) Foreign Application Priority Data

Mar. 5, 2004    (JP) ............................. 2004-062320

(51) Int. Cl.
*H04L 12/28* (2006.01)

(52) U.S. Cl. ............. 370/390; 370/395.41; 370/395.52; 370/397; 370/465

(58) Field of Classification Search ............ 370/395.42, 370/395.51, 395.52, 397, 412, 465; 709/200, 709/203, 219, 220, 231, 249
See application file for complete search history.

(56) References Cited

U.S. PATENT DOCUMENTS 6,434,622 B1 *   8/2002  Monteiro et al. ............ 709/231
6,523,069 B1 *   2/2003  Luczycki et al. ............ 709/249
6,714,987 B1 *   3/2004  Amin et al. .................. 709/249
6,782,490 B2 *   8/2004  Maxemchuk et al. ......... 714/18
6,934,756 B2 *   8/2005  Maes .......................... 709/227

(Continued)

FOREIGN PATENT DOCUMENTS

JP    10-041948 A    2/1998

(Continued)

OTHER PUBLICATIONS

Nakayama et al., "A Study of An Adaptive Admission Control Method", Proceedings of the 2003 IEICE General Conference, B-7-31, p. 291, Mar. 3, 2003.

*Primary Examiner*—Ayaz R Sheikh
*Assistant Examiner*—Andrew C Lee
(74) *Attorney, Agent, or Firm*—Sughrue Mion, PLLC (57) ABSTRACT

A server proxy (12), which is arranged between a distribution server (11) and a router (13a), adds quality information to a packet (19a) from the distribution server (11) to output a packet (19b). A plurality of reception terminal proxies (17a-17n), which are arranged immediately before respective reception terminals (18a-18n), remove the quality information from the packet (19b) distributed via a network (14) and routers (13b-13m), and distribute only necessary information to the respective reception terminals (18). Each reception terminal proxy (17) which includes a quality information acquisition unit (17A) acquires the quality information to transmit, from a quality information calculation/transmission unit (17B), the quality information (51) to an accumulation server (15). The accumulation server (15) saves, in a quality information database, packet quality information (52) for each reception terminal (18).

9 Claims, 5 Drawing Sheets

U.S. PATENT DOCUMENTS

| | | | |
|---|---|---|---|
| 7,272,155 B2 * | 9/2007 | Kenney et al. | 370/469 |
| 7,272,613 B2 * | 9/2007 | Sim et al. | 707/102 |
| 7,289,517 B1 * | 10/2007 | Shimonishi | 370/395.52 |
| 7,296,091 B1 * | 11/2007 | Dutta et al. | 709/245 |
| 7,362,702 B2 * | 4/2008 | Terrell et al. | 370/230 |
| 7,404,201 B2 * | 7/2008 | Takeuchi et al. | 725/109 |
| 2002/0023164 A1 * | 2/2002 | Lahr | 709/231 |
| 2002/0027917 A1 * | 3/2002 | Sugai et al. | 370/394 |
| 2002/0044557 A1 * | 4/2002 | Isoyama | 370/395.42 |
| 2002/0052798 A1 * | 5/2002 | Nishikado et al. | 705/26 |
| 2002/0075805 A1 * | 6/2002 | Gupta et al. | 370/235 |
| 2002/0159463 A1 * | 10/2002 | Wang | 370/401 |
| 2005/0010653 A1 * | 1/2005 | McCanne | 709/219 |
| 2005/0197908 A1 * | 9/2005 | Asami | 705/26 |

FOREIGN PATENT DOCUMENTS

| | | |
|---|---|---|
| JP | 2003-283552 A | 10/2003 |
| JP | 2003-333577 A | 11/2003 |
| JP | 2003-348133 A | 12/2003 |

* cited by examiner

COMMUNICATION QUALITY MANAGEMENT AND APPARATUS

This application claims priority from PCT Application No. PCT/JP2004/017281 filed Nov. 19, 2004, and from Japanese Patent Application No. 2004-062320 filed Mar. 5, 2004, which applications are incorporated herein by reference.

TECHNICAL FIELD

The present invention relates to a communication quality management method and apparatus and, more particularly, to a communication quality management method and apparatus when simultaneously multicasting data in the form of multicast packets from a distribution server to a plurality of reception terminals via a network such as the Internet.

BACKGROUND ART

A variety of services are provided via a network due to the widespread use of a broadband network. Among these services, a streaming distribution service represented by a sport relay broadcasting is available. Streaming is not playback upon completion of downloading files of audio and video data via the Internet or the like, but playback while downloading the files.

Unicast of streaming data (one-to-one communication form which designates only one message destination address) requires user count-dependent resources such as a distribution server load and network band. It is difficult to apply streaming unicast to a large-scale service. Multicast (communication form for distributing identical data to a plurality of destination addresses) is a technique for implementing one-to-many (plurality) communication. Multicast is suitable for simultaneously transmitting data to many reception terminals as in streaming distribution.

Multicast does not have any mechanism of arrival confirmation or retransmission from a reception terminal side due to its nature. It is difficult to guarantee confirmation and quality of a reception status at each reception terminal. In particular, when multicast distribution is applied to a service with accounting, the quality management and guarantee must be indispensable functions for each recipient. The absence of these functions bottlenecks commercial utilization of multicast distribution.

Several references disclose conventional multicast techniques (e.g., Japanese Patent Laid-Open Nos. 2003-348133 and 2003-333577).

Figure 7:
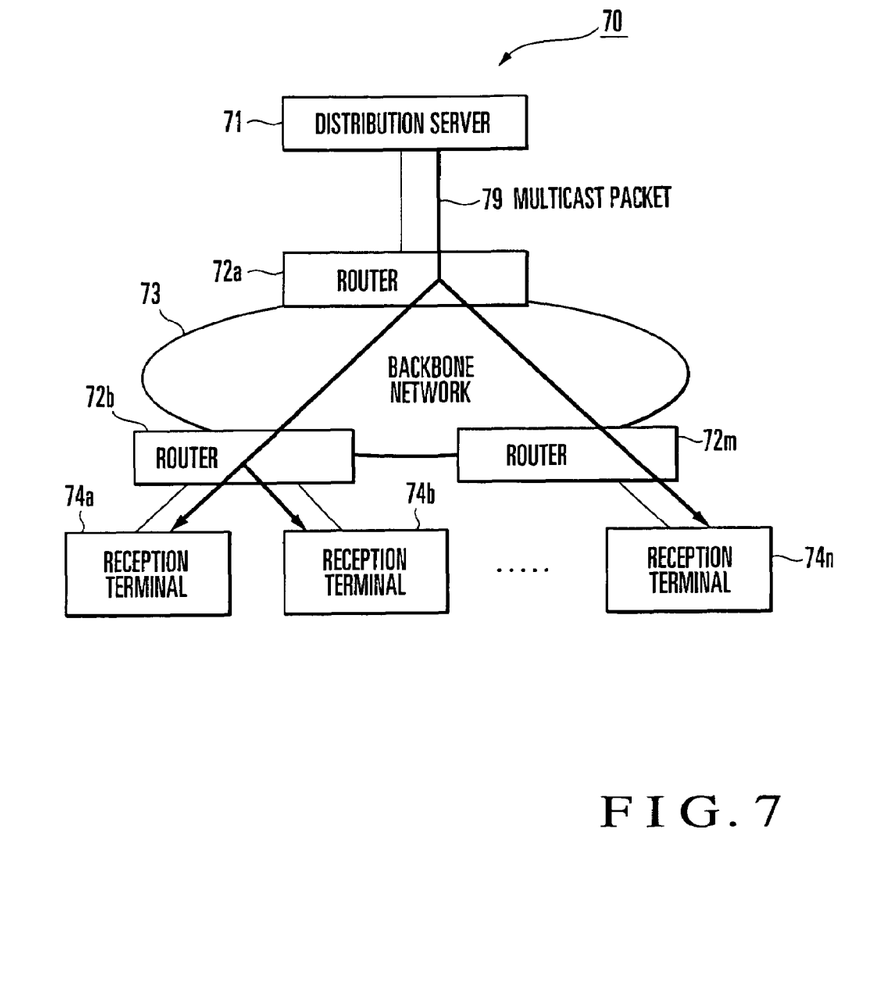
FIG. 7 is a block diagram showing the configuration of a conventional multicast distribution system.

FIG. 7 is a block diagram showing the configuration of a general conventional multicast distribution system. A multicast distribution system 70 comprises a distribution server 71, a backbone network 73 having a plurality of routers 72a to 72m, and a plurality of reception terminals 74a to 74n. The distribution server 71 is connected to the router 72a, and at least one reception terminal 74 is connected to each of the routers 72b, . . . , 72m. In the specific example illustrated in FIG. 7, the reception terminals 74a and 72b are connected to the router 72b, and the reception terminal 74n is connected to the router 72m.

The general multicast distribution system 70 shown in FIG. 7 distributes a multicast packet 79 from the distribution server 71 to the reception terminals 74a and 74b via the routers 72a and 72b. The distribution system also distributes the multicast packet 79 to the reception terminal 74n via the routers 72a and 72m.

DISCLOSURE OF INVENTION

Problems to be Solved by the Invention

In the above conventional multicast distribution system, it is impossible to confirm distribution and distribution quality of data distributed from the distribution server to the plurality of reception terminals.

The present invention has been made in consideration of the above problems of the prior art and, has as its object to provide a communication quality management method and apparatus which can overcome the conventional problems and can easily be implemented in a conventional system.

Means for Solving the Problems

According to the present invention, there is provided a communication quality management method of multicasting data from a distribution server to a plurality of reception terminals via a router connected to a network, comprising the steps of adding quality information to a multicast packet distributed from the distribution server, acquiring the quality information from the multicast packet distributed via the router, and distributing, to the reception terminal, the multicast packet from which the quality information is removed.

According to the present invention, there is provided a communication quality management apparatus for multicasting data from a distribution server to a plurality of reception terminals via a router connected to a network, comprising a server proxy arranged between the distribution server and the router to add quality information to a multicast packet, a reception terminal proxy arranged between the router and the reception terminal and including a quality information acquisition unit which acquires, from the multicast packet, the quality information added by the server proxy and a quality information calculation/transmission unit, the reception terminal proxy distributing, to the reception terminal, the multicast packet from which the quality information is removed, and an accumulation server which receives and accumulates the quality information from the reception terminal proxy.

Effects of the Invention

The communication quality management method and apparatus of the present invention can attain the following practically typical effects. That is, the method and apparatus can acquire the quality information in data distribution using a multicast. The method and apparatus can acquire the quality information by adding the proxies on the server and reception terminal sides without changing the existing distribution server, reception terminal, and network configuration. Therefore, the method and apparatus can use the existing devices without any change.

BEST MODE FOR CARRYING OUT THE INVENTION

The configurations and operations of preferred embodiments of a communication quality management method and apparatus according to the present invention will be described in detail with reference to the accompanying drawings.

First Embodiment

A communication quality management apparatus according to the first embodiment of the present invention will be described with reference to FIG. 1.

Figure 1:
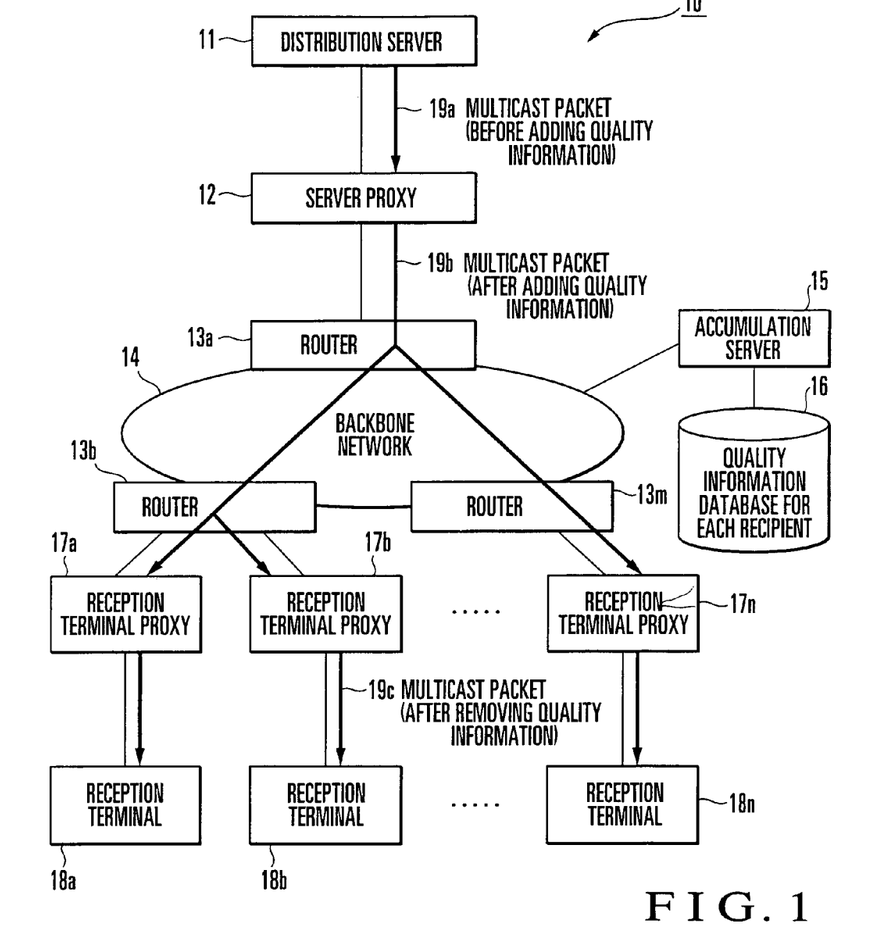
FIG. 1 is a block diagram showing the overall configuration of a communication quality management apparatus according to the first embodiment of the present invention.

As shown in FIG. 1, a communication quality management apparatus 10 comprises a distribution server 11, a server proxy 12, a plurality of routers 13a to 13m connected to a backbone network 14 serving as a network such as the Internet, reception terminal proxies 17a to 17n, a plurality of reception terminals 18a to 18n, an accumulation server 15 connected to the backbone network 14, and a quality information database 16 connected to the accumulation server 15.

As can be apparent from the comparison with the conventional multicast distribution system 70 described above, the communication quality management apparatus 10 of the present invention includes the server proxy 12 located under the distribution server 11, i.e., between the distribution server 11 and the router 13a.

The reception terminal proxies 17a to 17n are located before the inputs of the reception terminals 18a to 18n, i.e., between the reception terminals 18a to 18n and the routers 13b to 13m. In addition, the quality information database 16 for each recipient (each reception terminal) is connected to the backbone network 14 via the accumulation server 15.

The backbone network 14 is a network corresponding to multicast transfer. The routers 13a to 13m forming the backbone network 14 are routers compatible with multicast transfer. The routers 13a to 13m may be other distribution means compatible with multicast transfer.

In the communication quality management apparatus 10 shown in FIG. 1, the server proxy 12 has a quality information adding function of obtaining a packet 19b by adding quality information to a multicast packet (to be simply referred to as a packet hereinafter) 19a sent from the distribution server 11. The reception terminal proxies 17a to 17m have a quality information removing function of obtaining a packet 19c such that the quality information is removed from the quality infor- mation-added packet 19b transferred via the routers 13a to 13m, and distributing the packet 19c to the corresponding reception terminals 18a to 18n.

Figure 2:
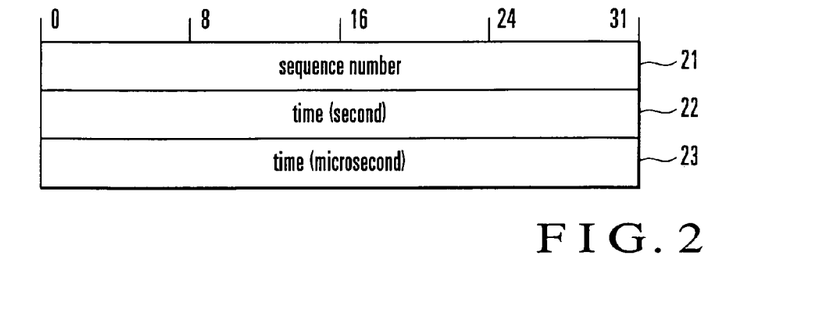
FIG. 2 is a view showing the detailed example of a quality information header added by a server proxy in FIG. 1.

As shown in FIG. 2, the quality information header comprises a field 21 for entering a sequence number (32 bits) of each packet, and time (second) and time (microsecond) fields 22 and 23 for entering times using 1970/1/10:00 as an epoch.

In this embodiment, each field length is 32 bits. The field lengths may be different from each other as needed. In this embodiment, information based on quality control is not used. However, another quality information header prepared to include a field for the quality management information may be used.

Figure 3A:
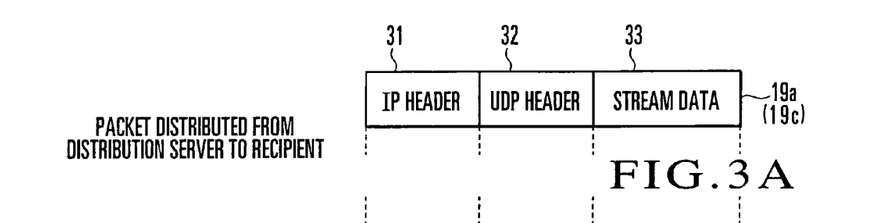
FIG. 3A is a view for explaining a packet to be received by a reception terminal upon transmission of the packet from the distribution server among the first detailed example of packets distributed from the distribution server to the reception terminal.
Figure 3B:
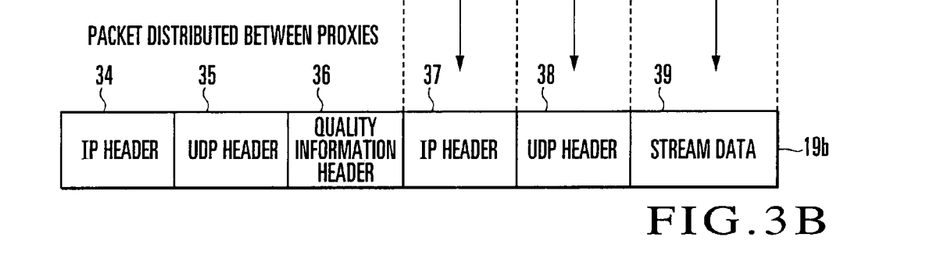
FIG. 3B is a view for explaining a packet distributed between proxies among the first detailed example of the packets distributed from the distribution server to the reception terminal.

A practical example of the packet 19b obtained by adding a quality information header to the packet 19a will be described with reference to FIGS. 3A, 3B, 4A, and 4B. FIG. 3A shows an example of the packet 19a (or a packet 19c) to be distributed from the distribution server 11 to the reception terminal 18 serving as the final recipient. FIG. 3B shows a detailed example of the packet 19b to be distributed between the proxies, i.e., between the server proxy 12 and each reception terminal proxy 17.

As shown in FIG. 3A, the packet 19c comprises fields of an IP (Internet Protocol) header 31, UDP (User Datagram Protocol) header 32, and stream data 33. The packet 19b shown in FIG. 3B comprises an IP header 34, UDP header 35, quality information header 36, IP header 37, UDP header 38, and stream data 39. As can be apparent from FIGS. 3A and 3B, the IP header 37, UDP header 38, and stream data 39 of the packet 19b are identical to the IP header 31, UDP header 32, and stream data 33 of the packet 19a (or 19c) and can be used without any change. The quality information header 36, UDP header 35, and UP header 34 are added to the original packet 19a to obtain a new packet 19b. In this embodiment, the original packet 19a can be used without any change, thereby facilitating processing.

Figure 4A:
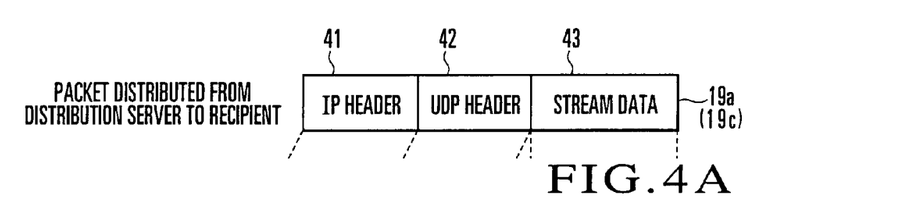
FIG. 4A is a view for explaining a packet received by a reception terminal upon transmission of the packet from the distribution server among the second detailed example of packets distributed from the distribution server to the reception terminal.
Figure 4B:
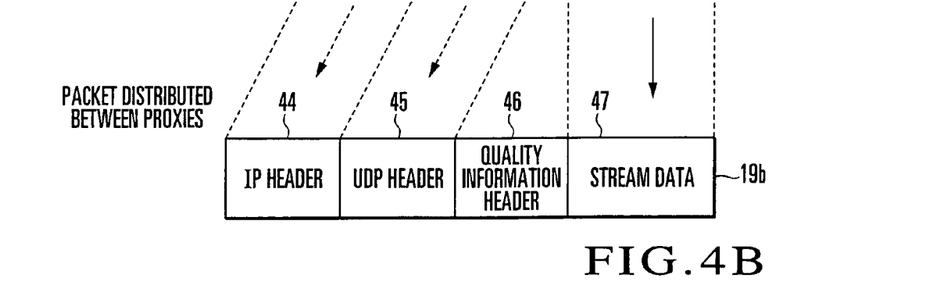
FIG. 4B is a view for explaining a packet distributed between proxies among the second detailed example of packets distributed from the distribution server to the reception terminal.

FIGS. 4A and 4B show other examples of the packet. FIG. 4A shows a packet 19a output from the distribution server 11, i.e., a packet 19c distributed to each reception terminal 18. FIG. 4B shows the packet 19b between the server proxy 12 and the reception terminal 17. In the detailed examples of FIGS. 4A and 4B, the packet 19a or 19c is identical to that of FIG. 3A in that an IP header 41, UDP header 42, and stream data 43 form the packet 19a or 19c, as shown in FIG. 4A. However, the packet 19b between the proxies comprises an IP header 44, UDP header 45, quality information header 46, and stream data 47. The IP header 44, UDP header 45, and stream data 47 of the packet 19b are basically identical to the IP header 41, UDP header 42, and stream data 43 shown in FIG. 4A. The packet 19b is obtained by adding only the quality information header 46 between the UDP header 45 and the stream data 47. In this case, since a packet length, a check sum value, and the like change, these fields must be rewritten to match a new packet 19b. As compared with the examples of FIGS. 3A and 3B, the packet lengths can advantageously be short. Packet formats other than those of FIGS. 3A, 3B, 4A, and 4B may be used.

Figure 5:
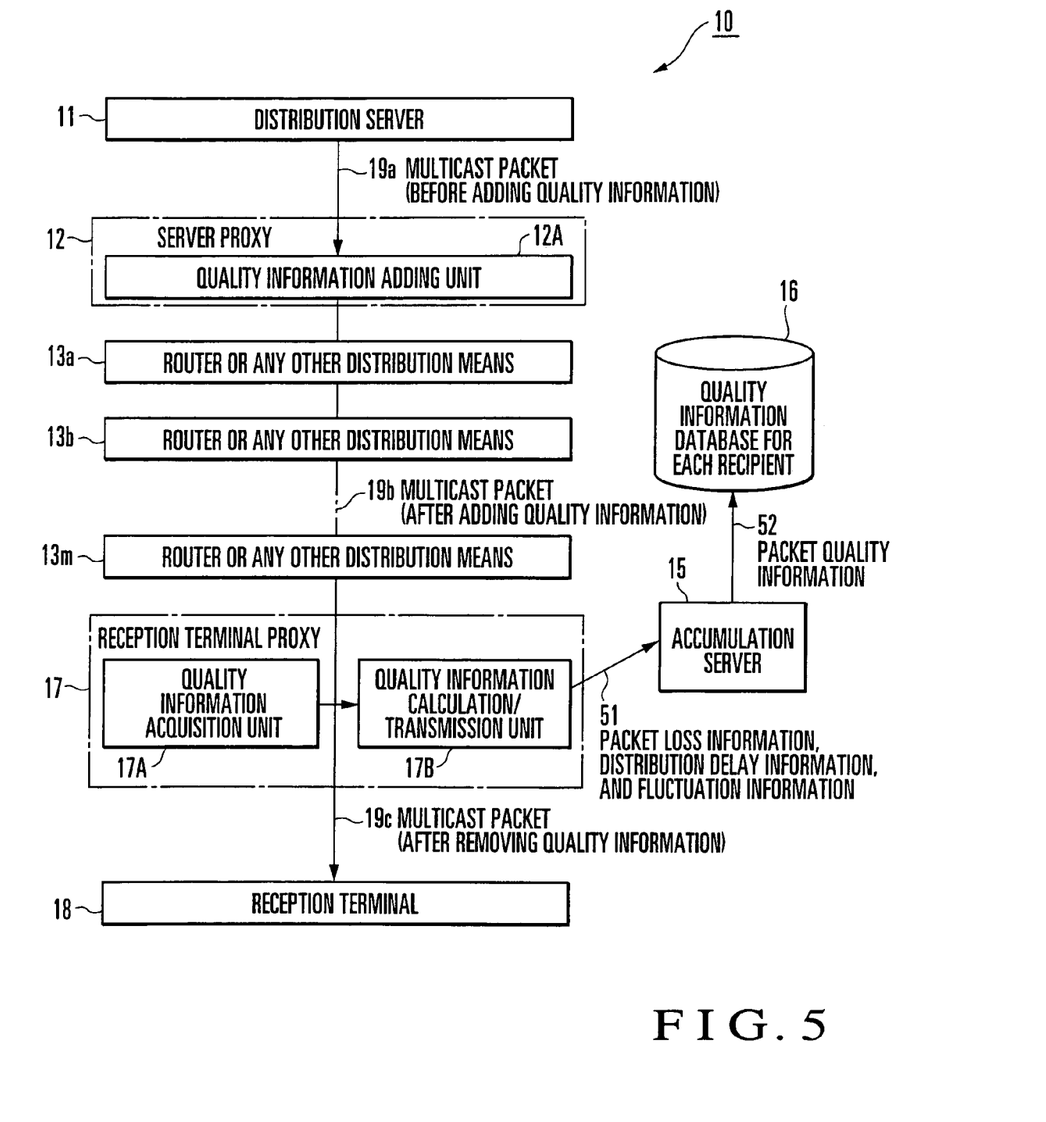
FIG. 5 is a view for explaining operation of the communication quality management apparatus shown in FIG. 1.

The operation of the communication quality management apparatus 10 according to the present invention shown in FIG. 1 will be described with reference to the view for explaining the operation in FIG. 5. First, the distribution server 11 outputs the multicast packet 19a containing the stream data 33 or 43 shown in FIG. 3A or 4A. The server proxy 12 receives the packet 19a output from the distribution server 11, and the quality information adding unit 12A of the server proxy 12 transmits the received packet 19a after the quality information header (36 in FIG. 3A or 46 in FIG. 4A) containing the quality management information is added to the packet 19a. The packet 19b with the quality information header transmitted from the server proxy 12 is transferred via the routers (or any other distribution means) 13a to 13m and received by the reception terminal proxies 17 arranged before the reception terminals 18.

Each reception terminal proxy 17 comprises a quality information acquisition unit 17A and quality information calculation/transmission unit 17B. The quality information acquisition unit 17A removes the quality information header 36 or 46 from the received packet 19b and sends the packet 19c to the corresponding reception terminal 18. The quality information acquisition unit 17A acquires the quality management information from the quality information header 36 or 46 and sends the quality management information to the quality information calculation/transmission unit 17B. The quality information calculation/transmission unit 17B checks a sequence number in the quality management information for each packet and detects the number of packets lost during the distribution.

A detailed example will further be described. Assume that the sequence number of a packet received upon reception of a packet having a sequence number of 1056 is 1059. In this case, it is found that the two packets having the sequence numbers of 1057 and 1058 are lost during the distribution. The number of lost packets is counted, and the count result is transmitted to the accumulation server 15 every predetermined time. The quality information calculation/transmission unit 17B also detects a distribution delay (i.e., a time required to distribute a packet from the server proxy 12 to each reception terminal proxy 17) for each packet by calculating a difference between a packet reception time and a time stamp in quality management information.

The quality information calculation/transmission unit 17B records the distribution delay for each packet and transmits an average value or variance of the distribution delays to the accumulation server 15 every predetermined time. The quality information calculation/transmission unit 17B can also acquire information on "fluctuation (or jitter)" from the two consecutively received packets. Assume that the time stamps in the quality management information of the two consecutively received packets 19b are ta1 and ta2, respectively, and that the reception times of these packets 19b are tb1 and tb2, respectively. The transmission interval of the two packets in the server proxy 12 is (ta2−ta1). The reception interval of these two packets at each reception terminal proxy 17 is (tb2−tb1). In this case, |(ta2−ta1)−(tb2−tb1)| is defined as the "fluctuation". The quality information calculation/transmission unit 17B calculates and records the "fluctuation". The average value or variance of the "fluctuation" information is calculated every predetermined time. The calculation result is transmitted to the accumulation server 15.

These packet loss information, distribution delay information, and "fluctuation" information 51 are transmitted from the quality information calculation/transmission unit 17B of each reception terminal proxy 17 to the accumulation server 15. Each information 51 transmitted to the accumulation server 15 is accumulated for each recipient (i.e., each reception terminal 18) and saved in the quality information database 16 as packet quality information 52 for each reception terminal 18.

Second Embodiment

Figure 6:
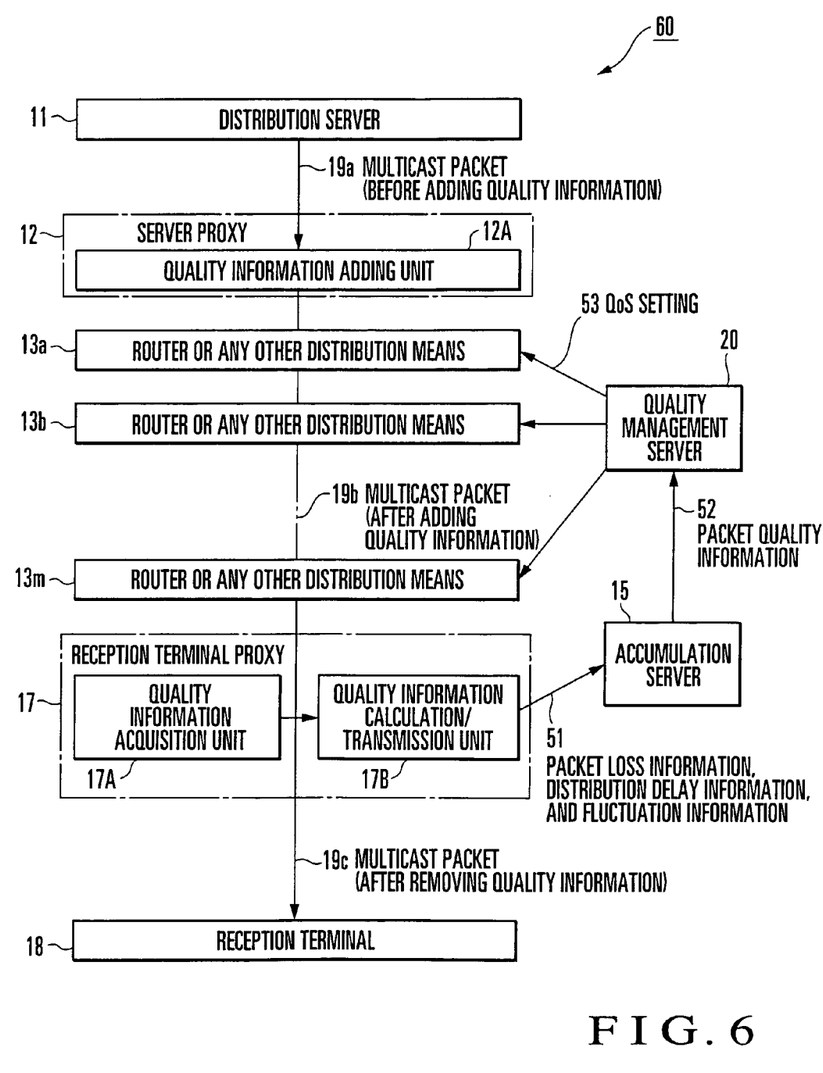
FIG. 6 is a view for explaining operation of a communication quality management apparatus according to the second embodiment of the present invention.

A communication quality management apparatus according to the second embodiment of the present invention will be described with reference to FIG. 6. The same constituent elements of the first embodiment are denoted by the same reference numerals for the descriptive convenience. A communication quality management apparatus 60 shown in FIG. 6 comprises a distribution server 11, server proxy 12, a plurality of routers 13a to 13m, a plurality of reception terminal proxies 17, a plurality of reception terminals 18, accumulation server 15, and quality management server 20. That is, as can be apparent from the comparison with FIG. 5 described above, the apparatus of the second embodiment is different from that of the first embodiment in that the quality management server 20 is arranged in place of the quality information database 16 for each recipient of the first embodiment in FIG. 5.

The operation of the communication quality management apparatus 60 according to the second embodiment shown in FIG. 6 will now be described. The quality management server 20 receives packet quality information acquired by a quality information acquisition unit 17A of the reception terminal proxy 17 arranged for each reception terminal 18 and accumulated in the accumulation server 16 upon transmission from a quality information calculation/transmission unit 17B to the accumulation server 15.

The quality management server 20 executes a QoS (Quality of Service) setting 53 for each router 13 in a backbone network 14 on the basis of the quality information 52 sent from the accumulation server 15. This makes it possible to improve the reception quality of each reception terminal 18.

For example, the QoS setting 53 of each router is performed as follows. Band control setting is executed in the router 13 in order to prevent loss of a packet 19, thereby ensuring the necessary band for packet distribution. Priority control setting is executed in the router 13 in order to reduce the delay or "fluctuation", thereby preferentially transferring the packet 19 over any other packet.

A case of QoS setting 53 in each router 13 from the quality management server 20 will be explained below.

(1) When the reception quality of a specific recipient is less than a predetermined reference, QoS is set in a router on a multicast distribution path to the specific recipient, thereby ensuring the distribution quality of the corresponding packet.

(2) When the average value or worst value of the reception qualities of all recipients is less than a predetermined reference, QoS is set in each router 13 in the backbone network 14, thereby ensuring the distribution quality of the corresponding packet.

In this embodiment, while each reception terminal 18 receives a packet, the accumulation server 15 receives information on quality from the recipient proxy 12 every predetermined time. The accumulation server 15 can grasp the number of current recipients. It is also possible to perform control based on the number of recipients as follows.

(3) QoS setting 53 is executed for packets received by a predetermined number of recipients or more regardless of the reception quality of each recipient, thereby ensuring the distribution quality.

In QoS setting, an algorithm for determining a specific router 13 in the backbone network 14 to which QoS setting is executed can be arbitrary. For example, case (1) may employ the following method. A combination of a given recipient and a router subjected to QoS setting in case of degradation of the reception quality of the given recipient may be registered in advance.

Case (2) may employ the following method. Upon reduction in the average value of the reception qualities of all the recipients, the statuses of the routers 13 in the backbone network 14 are checked, and the QoS setting 53 is performed for only a router with a heavy load.

The configurations and operations of the preferred embodiments of the communication quality management method and apparatus according to the present invention have been described. These embodiments are merely examples. It should be noted that the present invention is not limited to these embodiments. Various changes and modifications may be made in specific applications without departing from the spirit and scope of the present invention, as can be apparent from those skilled in the art.

The invention claimed is:

1. A communication quality management method of multicasting data from a distribution server to reception terminals via a router connected to a network, the method comprising:
   receiving a multicast packet from the distribution server;
   adding quality information to the multicast packet;
   retransmitting the multicast packet with the added quality information via the router;
   removing the quality information from the multicast packet by a reception terminal proxy coupled between each corresponding reception terminal and the router;
   performing quality information calculations and data processing by the reception terminal proxy;
   transferring the processed quality information from each reception terminal proxy to an accumulation server coupled to the router;
   accumulating the transferred quality information in a database; and
   distributing, to the reception terminal, the multicast packet from which the quality information is removed.

2. The communication quality management method according to claim 1, wherein adding quality information comprises:
   adding the quality information as a quality information header between a user datagram protocol (UDP) header and stream data of the multicast packet, which is distributed from the distribution server.

3. The communication quality management method according to claim 1, wherein adding quality information comprises:
   adding the quality information before the multicast packet, which is distributed from the distribution server, as an IP header, a UDP header, and a quality information header.

4. The communication quality management method according to claim 1, wherein the quality information comprises packet loss information, distribution delay information, and fluctuation information.

5. The communication quality management method according to claim 1, further comprising:
   saving, for each reception terminal, the quality information acquired from the multicast packet in a database.

6. A communication quality management apparatus for multicasting data from a distribution server to reception terminals via a router connected to a network, the apparatus comprising:
   a server proxy arranged between the distribution server and the router to add quality information to a multicast packet received from the distribution server and retransmit the multicast packet with the added quality information via the router;
   a reception terminal proxy arranged between the router and the reception terminal and including
      a quality information acquisition unit which acquires, from the multicast packet, the quality information added by said server proxy and
      a quality information calculation/transmission unit, said reception terminal proxy distributing, to the reception terminal, the multicast packet from which the quality information is removed; and
   an accumulation server which receives and accumulates the quality information from said reception terminal proxy.

7. The communication quality management apparatus according to claim 6, further comprising:
   a quality information database which stores, for each reception terminal, the quality information processed by the quality information calculation/transmission unit and received by said accumulation server, the database being connected to said accumulation server.

8. The communication quality management apparatus according to claim 6, further comprising:
   a quality management server which receives packet quality information from said accumulation server and sets QoS of the router, the quality management server being connected to said accumulation server.

9. A communication quality management apparatus for multicasting data from a distribution server to reception terminals via a router connected to a network, the apparatus comprising:
   a server proxy arranged between the distribution server and the router to add quality information as a quality information header to a multicast packet received from the distribution server and retransmit the multicast packet with the added quality information via the router;
   reception terminal proxies arranged between the router and corresponding reception terminals, which reception terminal proxies distribute the multicast packet to the reception terminals, the reception terminal proxies including:
      a quality information acquisition unit, which removes the quality information header from the multicast packet, acquires the quality information from the quality information header, and distributes the multicast packet, from
   which the quality information header is removed, to the corresponding reception terminal, and
      a quality information calculation/transmission unit, which processes the acquired quality information and calculates results based on the processed quality information; and
   an accumulation server which receives and accumulates the quality information and the calculation results from each reception terminal proxy for each of the reception terminals.

* * * * *